(12) United States Patent
Miyazaki et al.

(10) Patent No.: US 12,123,453 B2
(45) Date of Patent: Oct. 22, 2024

(54) BICYCLE OPERATING DEVICE, BICYCLE ADAPTER, AND BICYCLE ASSEMBLY

(71) Applicant: Shimano Inc., Osaka (JP)

(72) Inventors: Kentaro Miyazaki, Osaka (JP); Kazutaka Fukao, Osaka (JP); Yoshimitsu Miki, Osaka (JP); Kohei Obuchi, Osaka (JP)

(73) Assignee: Shimano Inc., Osaka (JP)

( * ) Notice: Subject to any disclaimer, the term of this patent is extended or adjusted under 35 U.S.C. 154(b) by 759 days.

(21) Appl. No.: 17/115,112

(22) Filed: Dec. 8, 2020

(65) Prior Publication Data

US 2021/0086864 A1 Mar. 25, 2021

Related U.S. Application Data

(62) Division of application No. 16/136,832, filed on Sep. 20, 2018, now Pat. No. 10,889,348.

(30) Foreign Application Priority Data

Sep. 29, 2017 (JP) .................................. 2017-189953

(51) Int. Cl.
*F16B 43/00* (2006.01)
*B62K 23/06* (2006.01)
*B62L 3/02* (2006.01)

(52) U.S. Cl.
CPC .............. *F16B 43/00* (2013.01); *B62K 23/06* (2013.01); *B62L 3/02* (2013.01); *F16B 2043/008* (2013.01)

(58) Field of Classification Search
CPC ............ B62K 23/06; B62L 3/02; B65D 39/12
See application file for complete search history.

(56) References Cited

U.S. PATENT DOCUMENTS

| 8,028,601 | B2 | 10/2011 | Miki |
| 8,042,427 | B2 | 10/2011 | Kawakami et al. |
| 8,061,667 | B2 * | 11/2011 | Weiss ...................... B60T 7/102 |
| | | | 248/230.4 |
| 8,201,476 | B2 | 6/2012 | Tsumiyama |
| 8,375,825 | B2 | 2/2013 | Hirose et al. |
| 8,511,200 | B2 | 8/2013 | Tsai et al. |
| 8,584,550 | B1 | 11/2013 | Calendrille, Jr. |
| 9,073,595 | B2 * | 7/2015 | Miki ..................... B62K 23/06 |
| 9,511,815 | B2 | 12/2016 | Hirotomi et al. |
| 9,550,544 | B2 | 1/2017 | Takeuchi et al. |

(Continued)

FOREIGN PATENT DOCUMENTS

| CN | 104249791 A | 12/2014 |
| DE | 10 2014 203 822 A1 | 9/2014 |

(Continued)

*Primary Examiner* — Gary W Estremsky

(74) *Attorney, Agent, or Firm* — Global IP Counselors, LLP

(57) ABSTRACT

A bicycle adapter is configured to couple a bicycle operating device to a handlebar clamp is coupled to a handlebar. The bicycle adapter includes a first attachment surface and a second attachment surface. The first attachment surface is configured to be attached to an outer surface of the clamp. The second attachment surface is configured to be attached to the bicycle operating device. The first attachment surface has a first curved section. The second attachment surface has a second curved section that is different from the first curved section.

18 Claims, 12 Drawing Sheets

(56) References Cited

U.S. PATENT DOCUMENTS

| | | | |
|---|---|---|---|
| 10,137,957 B2 | 11/2018 | Miyazaki et al. | |
| 10,473,143 B2 * | 11/2019 | Basiliere | F16C 1/12 |
| 10,494,053 B2 | 12/2019 | Komada et al. | |
| 2010/0139442 A1 * | 6/2010 | Tsumiyama | B60T 7/102 |
| | | | 74/489 |
| 2011/0192249 A1 | 8/2011 | Tsumiyama | |
| 2015/0210342 A1 | 7/2015 | Fukao et al. | |
| 2017/0037894 A1 | 2/2017 | Miyazaki et al. | |
| 2018/0346069 A1 | 12/2018 | Masuda et al. | |

FOREIGN PATENT DOCUMENTS

| | | |
|---|---|---|
| JP | 49-146646 U | 12/1974 |
| JP | 7-180574 A | 7/1995 |
| JP | 2014-83903 A | 5/2014 |

* cited by examiner

BICYCLE OPERATING DEVICE, BICYCLE ADAPTER, AND BICYCLE ASSEMBLY

CROSS-REFERENCE TO RELATED APPLICATIONS

This application is a divisional application of U.S. patent application Ser. No. 16/136,832, filed on Sep. 20, 2018. This application claims priority to Japanese Patent Application No. 2017-189953, filed on Sep. 29, 2017. The entire disclosures of U.S. patent application Ser. No. 16/136,832, and Japanese Patent Application No. 2017-189953 are hereby incorporated herein by reference.

BACKGROUND

Field of the Invention

The present invention generally relates to a bicycle operating device, a bicycle adapter, and a bicycle assembly.

Background Information

Japanese Laid-Open Patent Publication No. 2014-83903 (Patent document 1) describes an example of a known bicycle operating device. The bicycle operating device is coupled to a handlebar of a bicycle via a clamp.

SUMMARY

In a case where a plurality of components including a bicycle operating device is coupled to a handlebar, if each operating device has a clamp and the clamp is coupled to the handlebar, the handlebar will be surrounded by complication. This adversely affects the usability.

One object of the present invention is to provide a bicycle adapter, and a bicycle assembly that contribute to improvement of the usability.

In accordance with an aspect of the present invention, a bicycle adapter is provided that is configured to couple a bicycle operating device to a handlebar clamp that is coupled to a handlebar. The bicycle adapter includes a first attachment surface and a second attachment surface. The first attachment surface is configured to be attached to an outer surface of the clamp. The second attachment surface is configured to be attached to the bicycle operating device. The first attachment surface has a first curved section. The second attachment surface has a second curved section that is different from the first curved section.

The bicycle operating device, the bicycle adapter, and the bicycle assembly according to the present invention contribute to improvement of the usability.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

One embodiment of a bicycle operating device 30 will now be described with reference to FIGS. 1 to 13. FIGS. 1 to 13 illustrate the bicycle operating device 30 that is coupled to the left side of a handlebar H. However, the bicycle operating device 30 can be coupled to the right side of the handlebar H. Preferably, when the bicycle operating device 30 is coupled to the right side of the handlebar H, the bicycle operating device is symmetrical to the structure shown in FIGS. 1 to 13 at left and right sides (i.e. a mirror image with respect to a vertical center plane of a bicycle).

Figure 1:
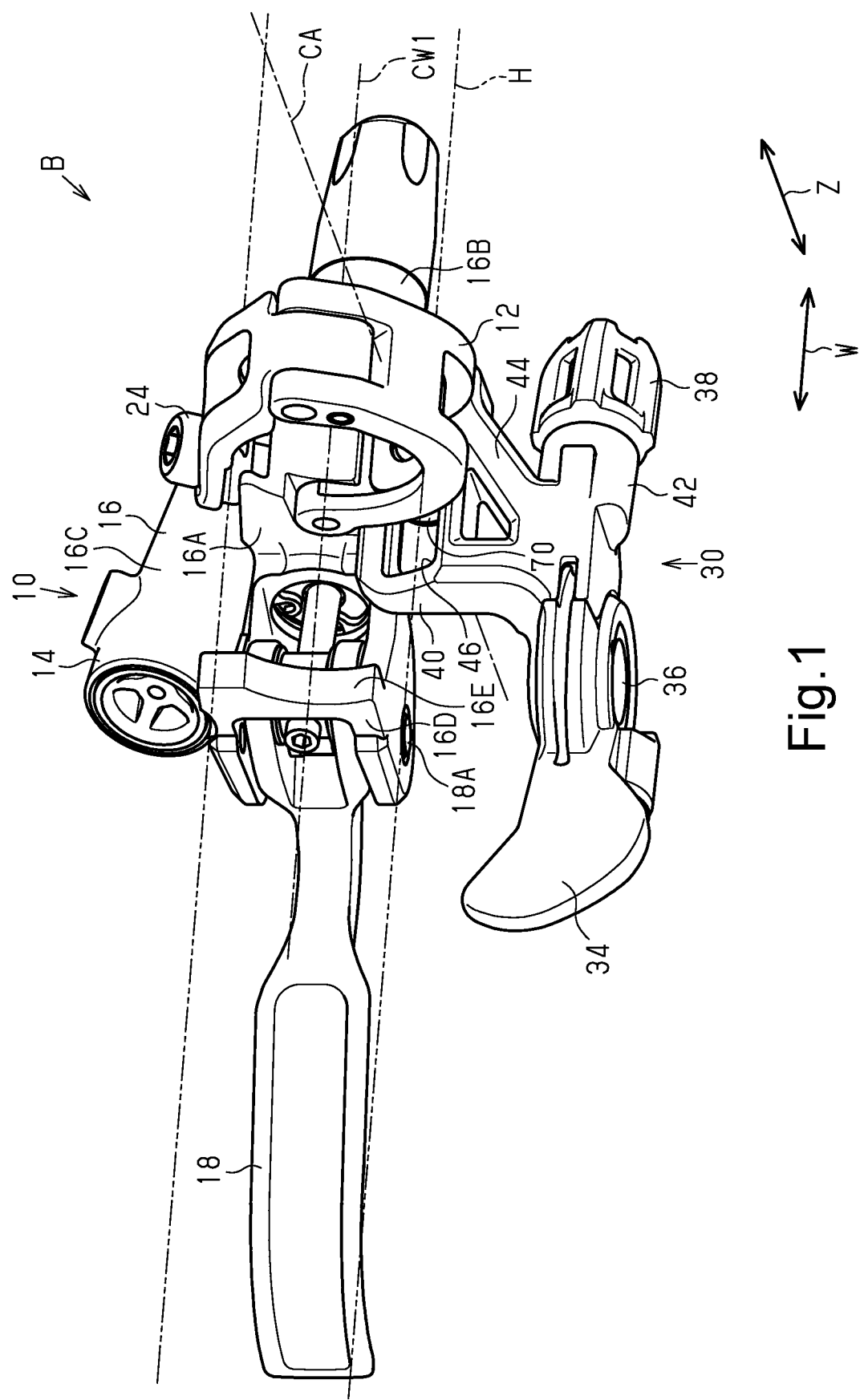
FIG. 1 is a front side perspective view of a bicycle operating device and a bicycle component in accordance with a first embodiment.
Figure 2:
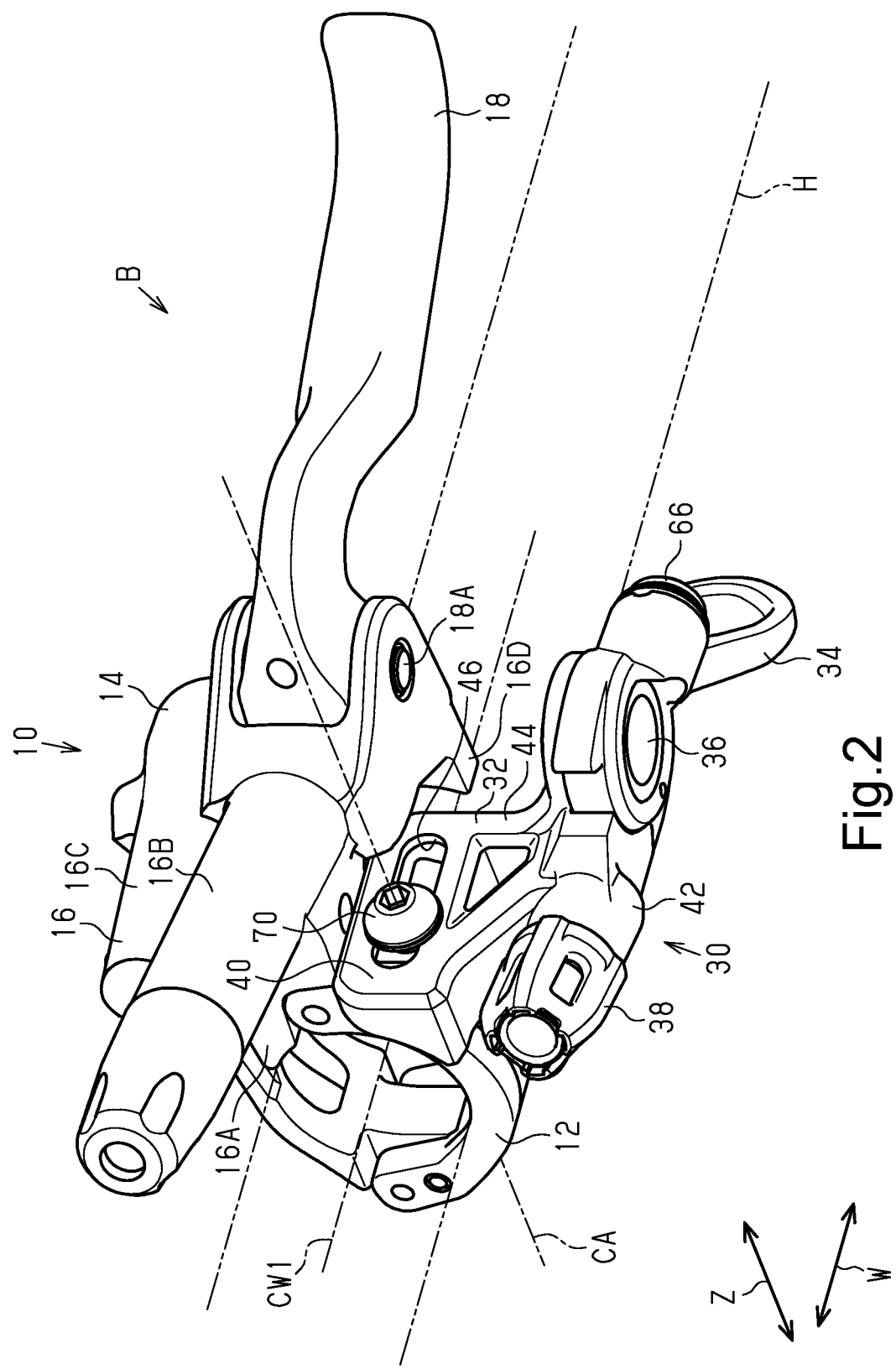
FIG. 2 is a rear side perspective view of the bicycle operating device and the bicycle component shown in FIG. 1.

As shown in FIGS. 1 and 2, a bicycle component 10 includes a clamp 12 configured to be coupled to the handlebar H of a bicycle B. In other words, the clamp 12 can be referred to as a bicycle handlebar clamp. In the example shown in FIG. 1, the bicycle component 10 includes a hydraulic brake operating device 14. The brake operating device 14 includes a main body 16 and a brake lever 18. The main body 16 is coupled to the handlebar H by being attached to the clamp 12. The brake lever 18 is coupled to the main body 16. The main body 16 includes a coupling portion 16A, a cylinder housing 16B, a reservoir housing 16C and a handlebar support 16D. The clamp 12 is coupled to the coupling portion 16A of the main body 16. The cylinder housing 16B includes a master cylinder. The reservoir housing 16C includes a reservoir for hydraulic fluid.

The cylinder housing 16B extends generally in a direction in which a first center axis CW1 of the clamp 12 extends. The reservoir housing 16C also extends generally in the direction in which the first center axis CW1 of the clamp 12 extends. The cylinder housing 16B and the reservoir housing 16C are disposed beside each other in a direction intersecting the first center axis CW1 of the clamp 12. The coupling portion 16A projects in a direction intersecting the first center axis CW1 of the clamp 12 from an intermediate part of the main body 16 with respect to the direction in which the first center axis CW1 of the clamp 12 extends. The coupling portion 16A is connected to the cylinder housing 16B and an intermediate part of reservoir housing 16C in the direction in which the first center axis CW1 of the clamp 12 extends.

Figure 3:
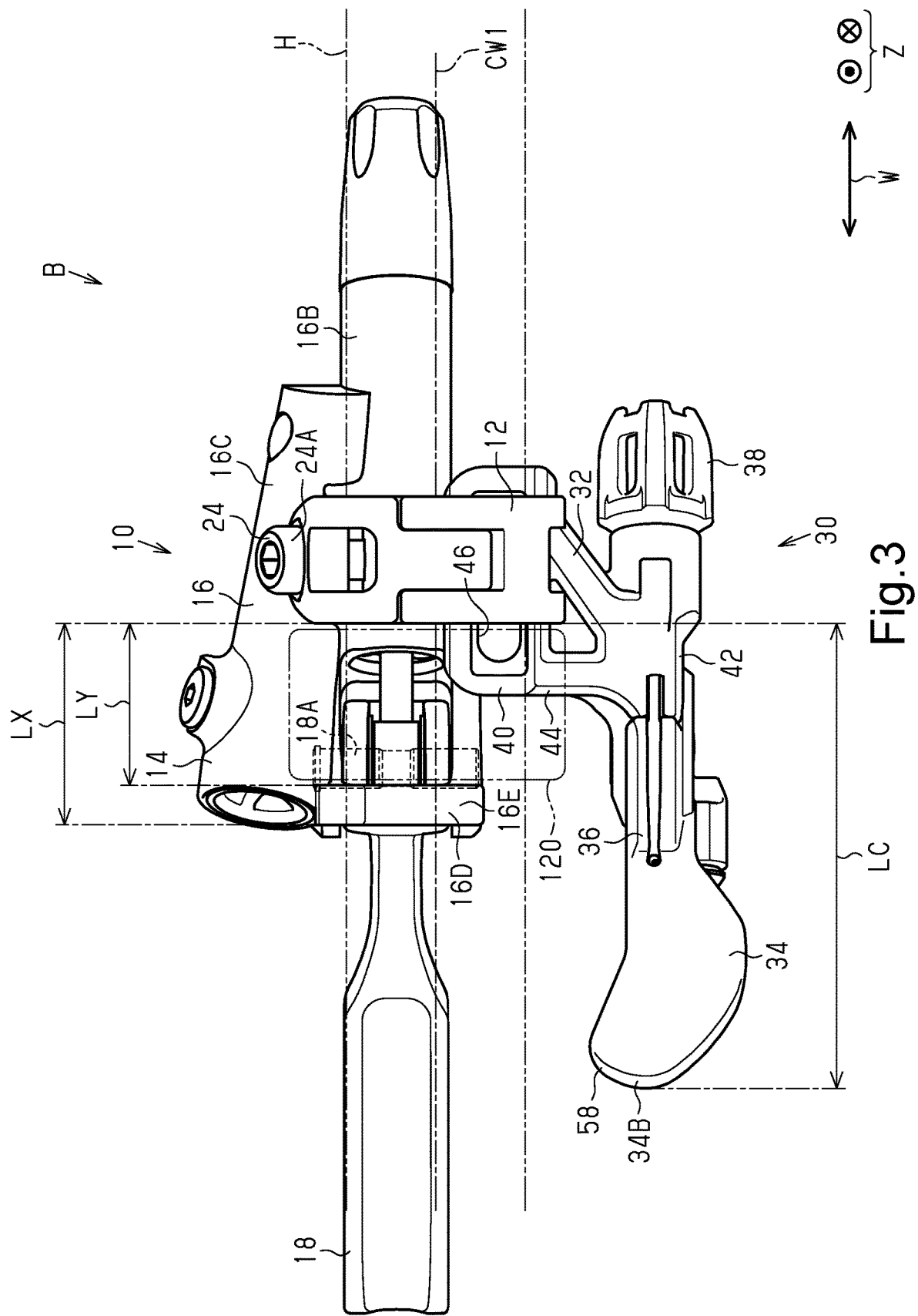
FIG. 3 is a front side elevational view of the bicycle component shown in FIG. 1.

The handlebar support 16D is arranged on one end of the main body 16 with respect to the direction in which the first center axis CW1 of the clamp 12 extends. The handlebar support 16D projects from the main body 16 in a direction opposite to the side where a rotation shaft 18A, which will be described later, is arranged. A gap is formed between the handlebar support 16D and the clamp 12 in the direction parallel to the first center axis CW1. The gap between the handlebar support 16D and the clamp 12 is large enough to receive at least part of a different component 120 as seen in FIG. 3. It is preferred that a distance LY between an end of the clamp 12 located toward a handlebar support surface 16E and an end of the handlebar support surface 16E located toward the clamp 12 be greater than or equal to 15 mm and less than or equal to 25 mm as viewed in a direction orthogonal to the direction in which the first center axis CW1 extends. It is further preferred that the distance LY be greater than or equal to 18 mm and less than or equal to 22 mm. In the present embodiment, the distance LY is set to 20.4 mm. At least part of the different component 120 can include a clamp configured to be coupled to the handlebar H. The different component 120 can include a user operated member. In a case where the user operated member of the different component 120 is disposed in the gap, the brake operating device 14, the bicycle operating device 30, and the user operated member of the different component 120 are concentrated in a certain range or area of the handlebar H. Thus, each operation is easily performed by the user. The different component 120 can be, for example, an operating device of a suspension controller or an operating device of an adjustable seatpost. The main body 16 is provided with the rotation shaft 18A extending in a direction intersecting the first center axis CW1 of the clamp 12 as viewed in a direction orthogonal to the first center axis CW1 and the axis of rotation of the rotation shaft 18A. The brake lever 18 is coupled to the main body 16 via the rotation shaft 18A. The brake lever 18 is coupled to the main body 16 to be pivotal with respect to the main body 16 about the rotation shaft 18A. The handlebar support 16D includes a support surface 16E contactable with the handlebar H. The support surface 16E is shaped corresponding to an outer surface of the handlebar H. More specifically, the support surface 16E has an arcuate curved surface. The support surface 16E receives force produced in the brake operating device 14 as the brake lever 18 pivots.

As shown in FIG. 3, the clamp 12 overlaps at least part of the cylinder housing 16B as viewed in a direction orthogonal to the direction in which the first center axis CW1 extends.

In the direction orthogonal to the direction in which the first center axis CW1 extends, it is preferred that the clamp 12 overlap the cylinder housing 16B from one end to the other end with respect to the direction in which the first center axis CW1 extends. The rotation shaft 18A is offset from the clamp 12 as viewed in a direction orthogonal to the direction in which the first center axis CW1 extends. As viewed in a direction orthogonal to the direction in which the first center axis CW1 extends, it is preferred that a distance LX between the end of the clamp 12 located toward the handlebar support surface 16E and an end of the handlebar support surface 16E opposite to the clamp 12 be greater than or equal to 20 mm and less than or equal to 30 mm. It is further preferred that the distance LX be greater than or equal to 22 mm and less than or equal to 27 mm. In the present embodiment, the distance LX is set to 25 mm.

Figure 4:
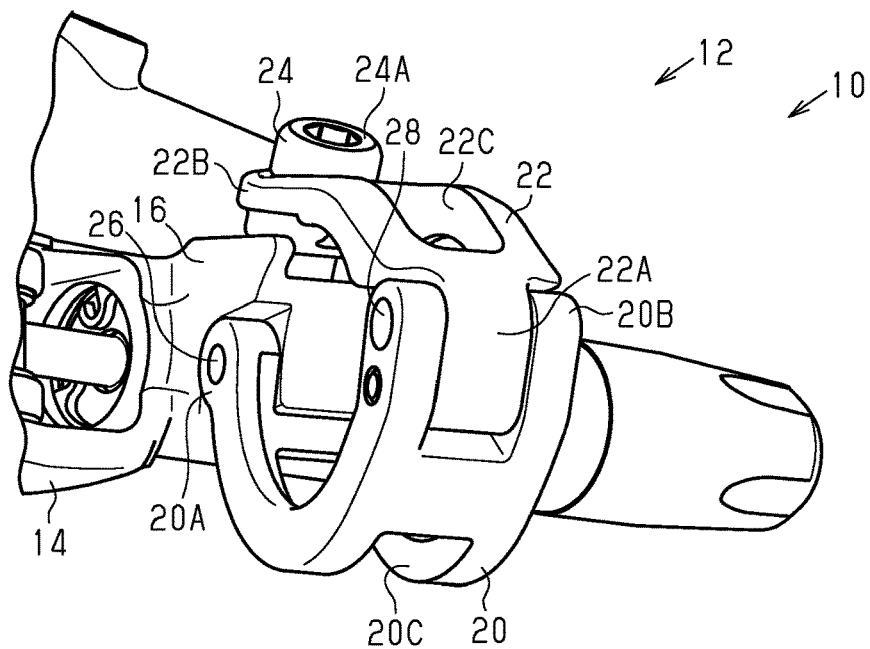
FIG. 4 is an enlarged perspective view of a portion of the bicycle component shown in FIG. 1 showing a clamp of the bicycle component.
Figure 5:
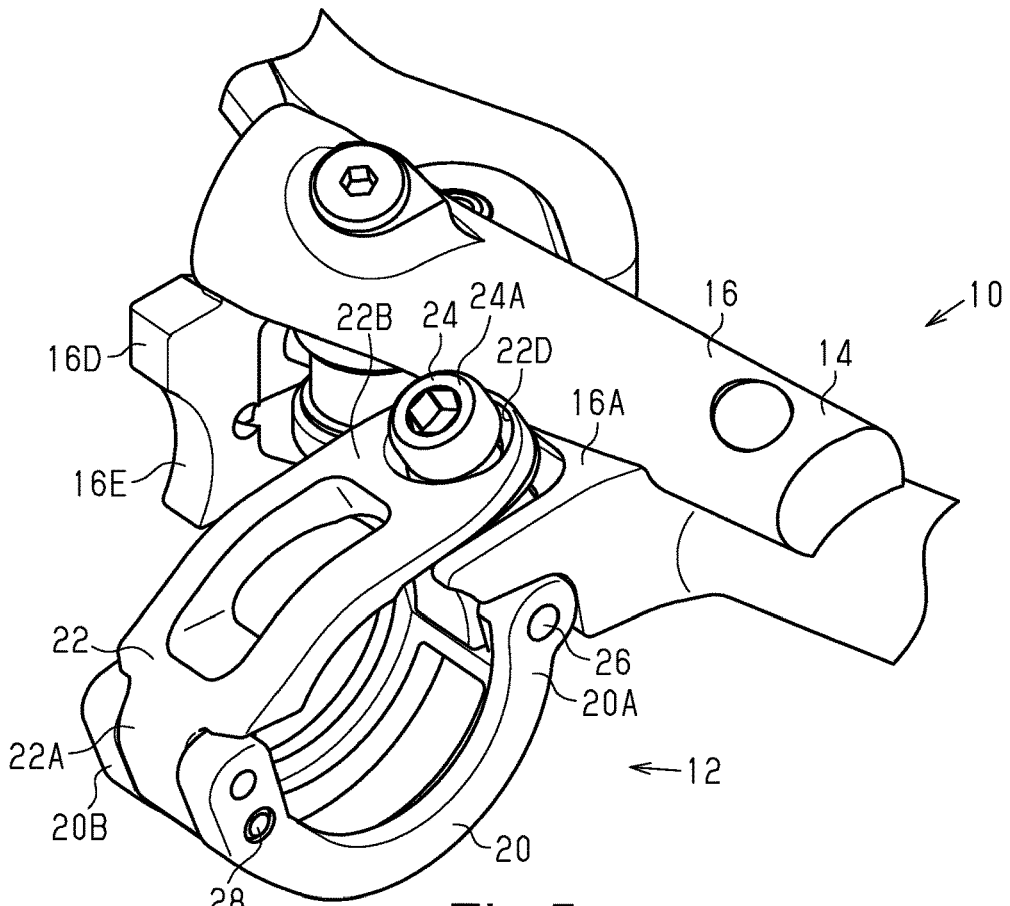
FIG. 5 is an enlarged perspective view of the clamp shown in FIG. 4 taken in a direction different from that of FIG. 4.

As shown in FIGS. 4 and 5, the clamp 12 includes a first clamp portion 20, a second clamp portion 22 separate from the first clamp portion 20, and a coupling member 24. The first clamp portion 20 and the second clamp portion 22 are formed separately from the main body 16 as separate pieces.

The first clamp portion 20 is formed in an arc shape. The first clamp portion 20 includes a first end 20A and a second end 20B. The first end 20A is coupled to the main body 16 via a first pin 26. The first clamp portion 20 is pivotally coupled to the main body 16 by the first pin 26. A first hole 20C is formed in an intermediate part of the first clamp portion 20 and extends in the circumferential direction. The first hole 20C is a rectangular hole.

The second clamp portion 22 is formed in an arc shape. The arc shape of the second clamp portion 22 is a less curved than that of the first clamp portion 20. In this specification, a flat surface has no curve. Also, in this specification, a curvature of a flat surface is defined as zero. The second clamp portion 22 includes a first end 22A and a second end 22B. The first end 22A is coupled to the second end 20B of the first clamp portion 20 via a second pin 28. The second clamp portion 22 is pivotally coupled to the first clamp portion 20 by the second pin 28. A second hole 22C is formed in an intermediate part of the second clamp portion 22 and extends in the circumferential direction. The second hole 22C is an elongated hole for weight reduction. The second end 22B of the second clamp portion 22 has a third hole 22D used to couple the second clamp portion 22 to the main body 16.

The coupling member 24 is inserted into the third hole 22D. One end of the coupling member 24 is joined with the coupling portion 16A. In one example, the coupling member 24 is a bolt, and the coupling portion 16A has an internal thread to which the bolt is fastened. The second end 22B of the second clamp portion 22 is held by a bolt head 24A of the coupling member 24 and the coupling portion 16A. This couples the second clamp portion 22 to the coupling portion 16A. The clamp 12 can be coupled to the handlebar H.

As shown in FIGS. 1 and 2, the bicycle operating device 30 is coupled to the clamp 12 via a fastener 70. The bicycle operating device 30 is coupled to a portion of the clamp 12 different from the brake operating device 14. The fastener 70 has a center axis CA. Hereafter, a direction parallel to the center axis CA is referred to as a center fastening axis direction Z. The center axis CA of the fastener 70 corresponds to a third center fastening axis of the fastener 70.

Figure 6:
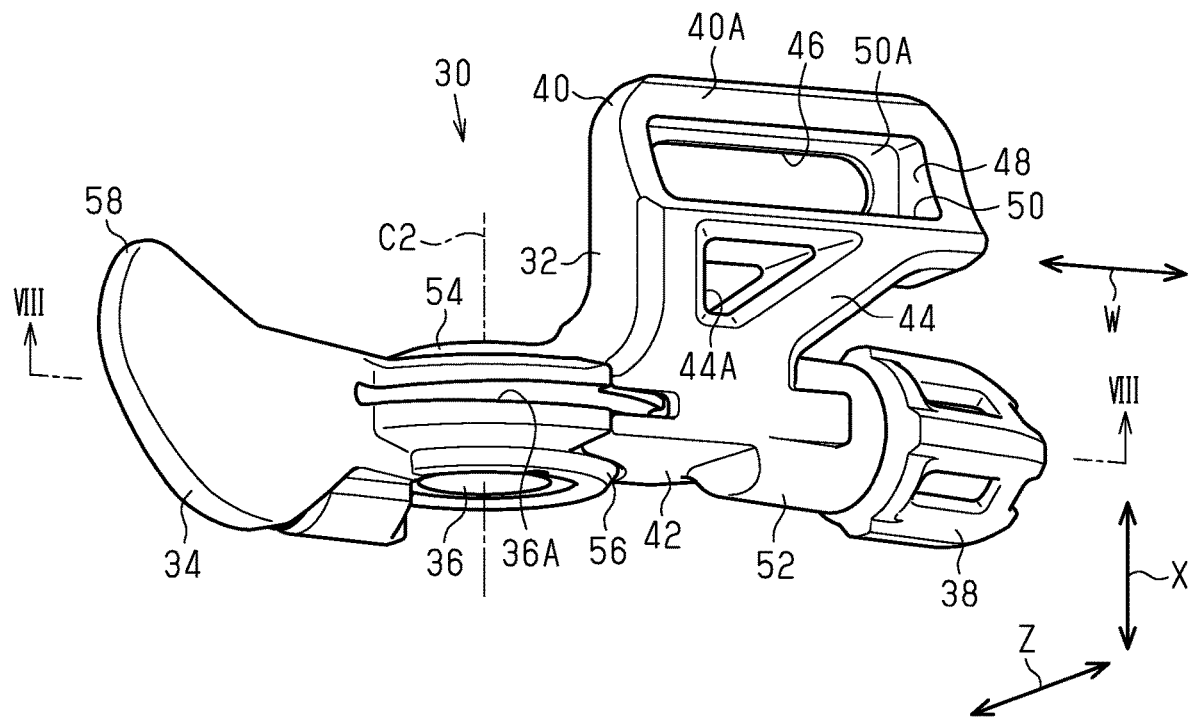
FIG. 6 is an enlarged perspective view of the bicycle operating device shown in FIG. 1.

As shown in FIG. 6, the bicycle operating device 30 includes a base member 32 and a user operated member 34. The bicycle operating device 30 further includes a pulling member 36. Here, the pulling member 36 is a cable puller that pulls and releases a mechanical control cable S with respect to the base member 32. The bicycle operating device 30 further includes a cable tension adjuster 38. The cable tension adjuster 38 is a device that adjusts a cable tension in the mechanical control cable S.

As shown in FIGS. 1 and 2, the base member 32 is configured to be coupled to the clamp 12. The base member 32 includes a coupling portion 40 configured to be coupled to the clamp 12. The base member 32 further includes a body 42 with which the user operated member 34 is joined and a connecting portion 44 connecting the body 42 and the coupling portion 40. The coupling portion 40 is configured to be directly coupled to the clamp 12.

As shown in FIG. 6, the coupling portion 40 includes an elongated hole 46. The coupling portion 40 has a longitudinal direction, which corresponds to a long dimension of the coupling portion 40. The elongated hole 46 has a longitudinal direction W extending in the longitudinal direction of the coupling portion 40. The longitudinal direction W of the elongated hole 46 as used herein refers to the longest dimension of the elongated hole 46. In the present embodiment, the elongated hole 46 is formed so that the longitudinal direction W of the elongated hole 46 corresponding to the longitudinal direction of the coupling portion 40. The coupling portion 40 includes a first surface 40A located toward the clamp 12, a second surface 40B (refer to FIG. 12) opposite to the first surface 40A, and at least one coupling hole 48 extending through the first surface 40A and the second surface 40B. The coupling portion 40 of the bicycle operating device 30 shown in FIG. 6 includes one coupling hole 48. The coupling hole 48 can adjust the coupling position of the coupling portion 40 in the direction of the first center axis CW1 of the clamp 12. More specifically, the coupling portion 40 is configured to so that the coupling position of the coupling hole 48 with respect to the clamp 12 is adjustable in the direction of the first center axis CW1. Thus, in a coupled state in which the coupling portion 40 is coupled to the clamp 12, the relative position of the clamp 12 and the coupling portion 40 is adjustable in the direction of the first center axis CW1. The first surface 40A includes a recess 50. The coupling hole 48 extends through a bottom surface 50A of the recess 50. The elongated hole 46 is open in the bottom surface 50A of the recess 50. That is, the elongated hole 46 extends through the bottom surface 50A.

Figure 9:
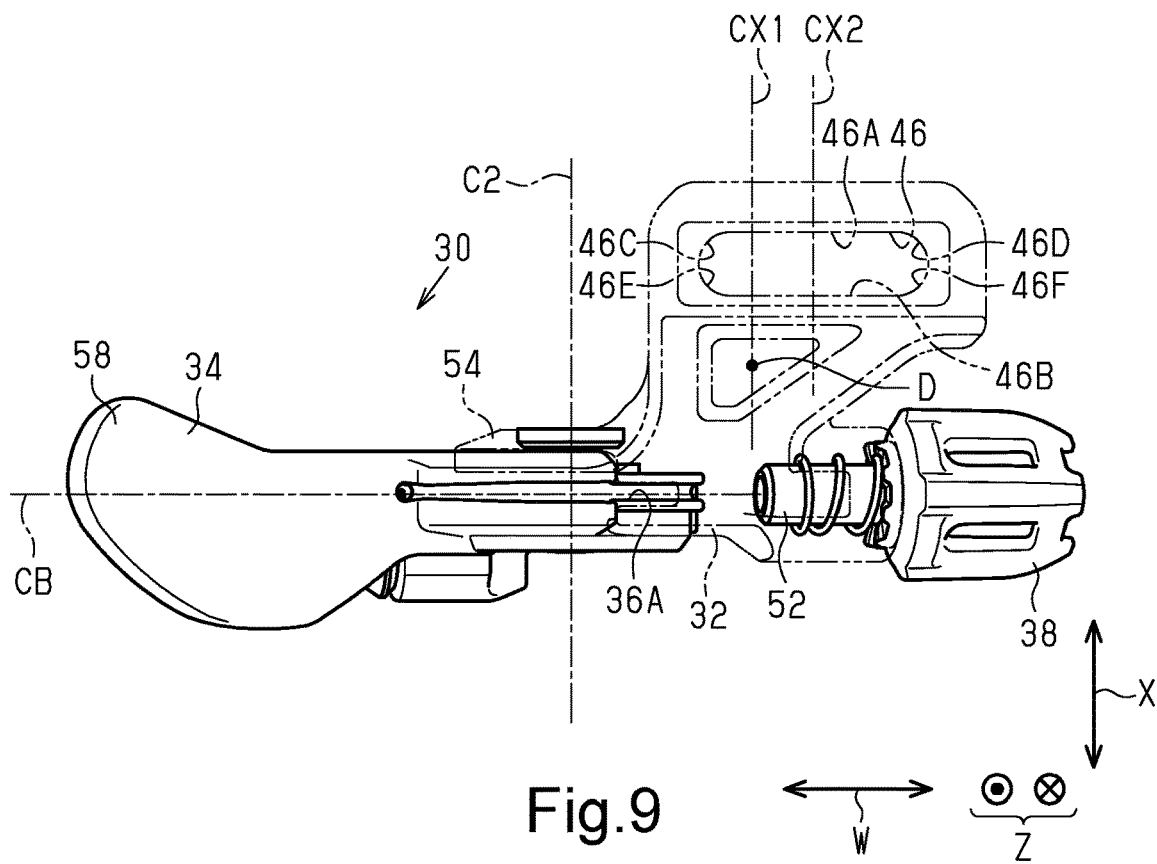
FIG. 9 is a front side elevational view of portions of the bicycle operating device shown in FIG. 6.

As shown in FIG. 9, the elongated hole 46 includes a first wall 46A, a second wall 46B, a third wall 46C, and a fourth wall 46D. The first wall 46A extends parallel to the longitudinal direction W as viewed in the center fastening axis direction Z of the fastener 70. The first wall 46A extends linearly as viewed in the center fastening axis direction Z of the fastener 70. The center fastening axis direction Z of the fastener 70 corresponds to an insertion direction of the fastener 70 in a case where the bicycle operating device 30 is coupled to the clamp 12 by the fastener 70. The second wall 46B faces the first wall 46A. The second wall 46B extends parallel to the longitudinal direction W as viewed in the center fastening axis direction Z of the fastener 70. The second wall 46B extends linearly as viewed in the center fastening axis direction Z of the fastener 70. The third wall 46C connects one end of the first wall 46A and one end of the second wall 46B. The third wall 46C is curved from the one end of the first wall 46A toward the one end of the second wall 46B. The fourth wall 46D connects the other end of the first wall 46A and the other end of the second wall 46B. The fourth wall 46D is curved from the other end of the first wall 46A to the other end of the second wall 46B. The elongated hole 46 includes a first end 46E located close to a mounting or winding axis C2 of the pulling member 36 and a second end 46F opposite to the first end 46E in the longitudinal direction W. The third wall 46C includes the first end 46E. The fourth wall 46D includes the second end 46F.

Figure 11:
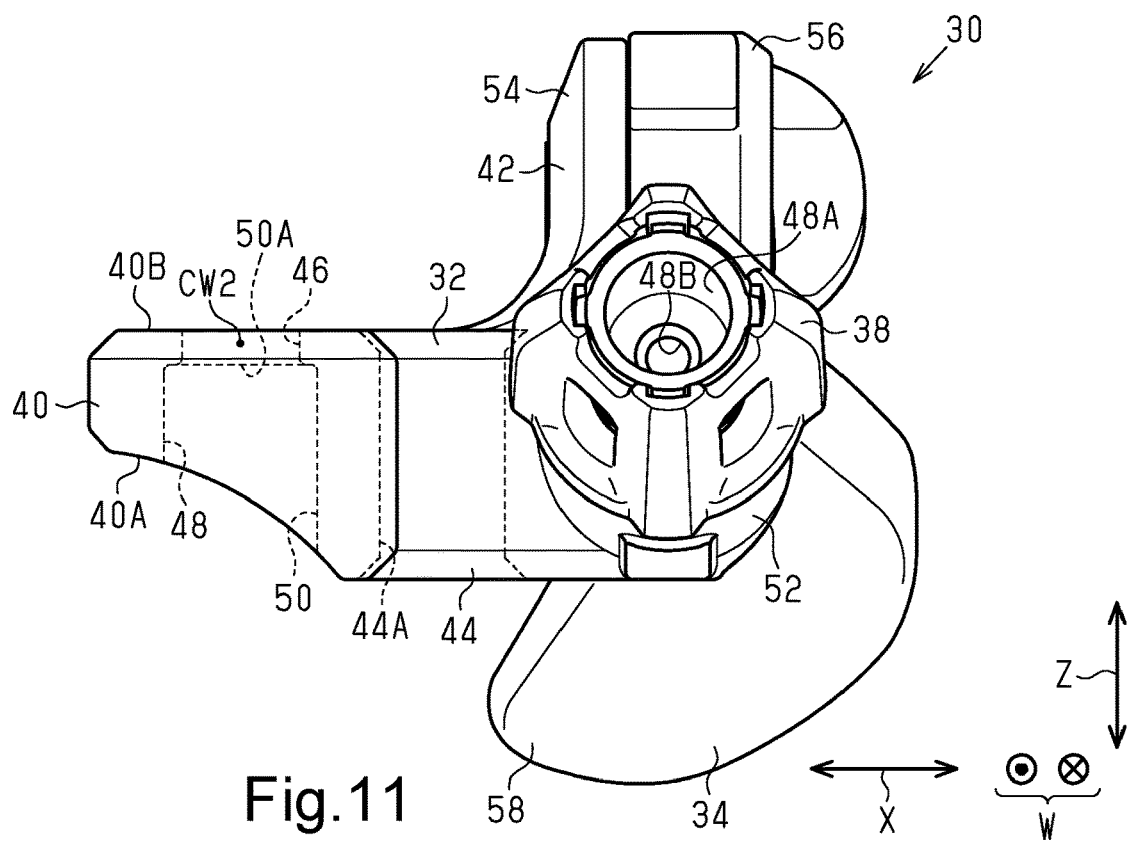
FIG. 11 is a right side elevational view of the bicycle operating device shown in FIG. 6.

As shown in FIG. 11, the first surface 40A is a curved surface. With the coupling portion 40 coupled to the clamp 12, the first surface 40A is disposed to face the rear side of the bicycle B. The second surface 40B is a flat surface. With the coupling portion 40 coupled to the clamp 12, the second surface 40B is disposed to face the front side of the bicycle B. The second surface 40B is less curved than the first surface 40A. The second surface 40B is a surface opposite to the first surface 40A. The coupling hole 48 includes the recess 50 and the elongated hole 46. The bottom surface 50A of the recess 50 is a flat surface parallel to the second surface 40B. The first surface 40A is arcuate. The arc of the first surface 40A corresponds to the arc of an outer surface 12B of the first clamp portion 20 of the clamp 12. More specifically, the first surface 40A is formed so as to be at least partially in planar contact with the outer surface 12B of the first clamp portion 20 of the clamp 12.

Figure 7:
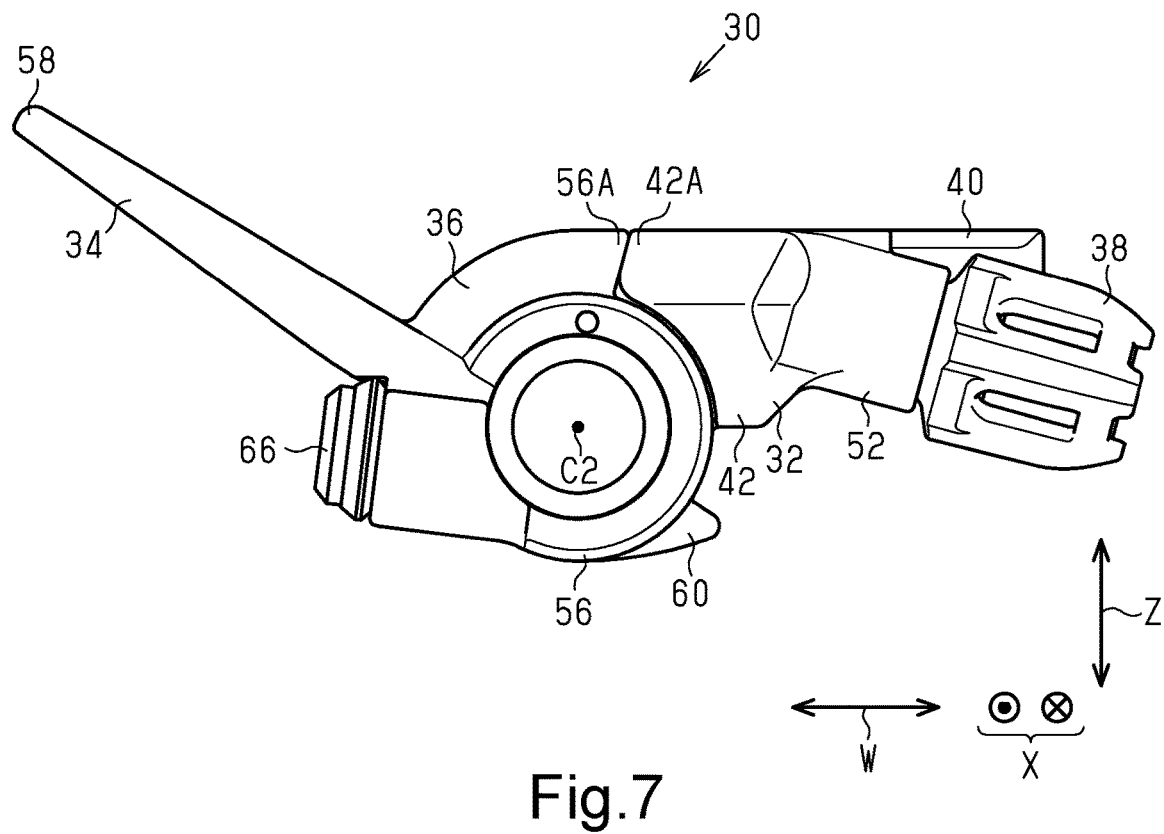
FIG. 7 is a bottom plan view of the bicycle operating device shown in FIG. 6.
Figure 8:
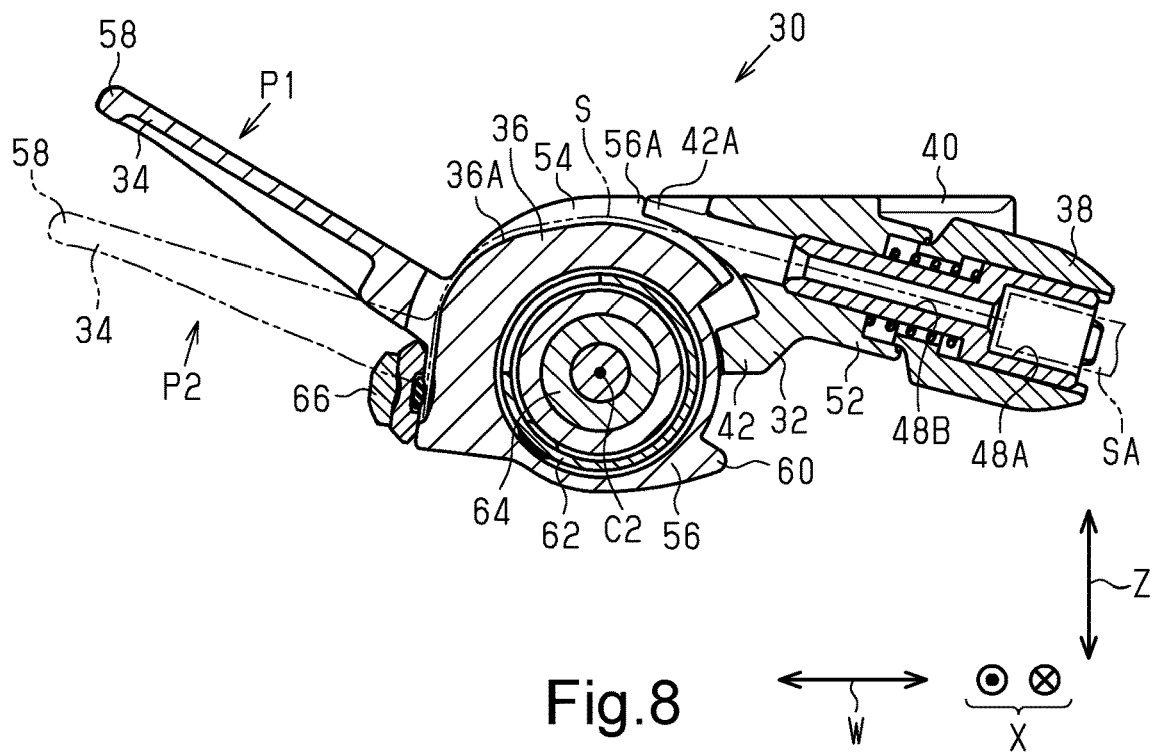
FIG. 8 is a cross-sectional view of the bicycle operating device taken along section line VIII-VIII in FIG. 6.

As shown in FIGS. 7 and 8, the body 42 includes a guide portion 52 guiding the mechanical control cable S and a support portion 54 to which the user operated member 34 is coupled. The guide portion 52 includes a recess 48A, into which one end of an outer cable SA covering the circumference of the mechanical control cable S is fitted, and a hole 48B, which guides the mechanical control cable S exposed from the outer cable SA to the user operated member 34. The support portion 54 is formed in a disc-like shape. The support portion 54 is arranged at an opening of the hole 48B of the guide portion 52 opposite to the recess 48A. The support portion 54 is formed separately from the guide portion 52. The support portion 54 is immovably coupled to the guide portion 52.

As shown in FIGS. 6 and 9, the connecting portion 44 is shorter than the coupling portion 40 in a direction parallel to the longitudinal direction W of the elongated hole 46. The connecting portion 44 is tapered so that the dimension of the connecting portion 44 in the longitudinal direction W decreases from the coupling portion 40 toward the body 42. The connecting portion 44 includes a through hole 44A. The through hole 44A is tapered so that the dimension of the through hole 44A in the longitudinal direction W decreases from the coupling portion 40 toward the body 42.

The connecting portion 44 connects the coupling portion 40 and the body 42. More specifically, the connecting portion 44 connects the coupling portion 40 and a portion of the body 42 that connects the guide portion 52 and the support portion 54. The connecting portion 44 has a centerline CX1 extending orthogonal to the longitudinal direction W through a center with respect to a direction parallel to the longitudinal direction W. The coupling portion 40 has a centerline CX2 extending orthogonal to the longitudinal direction W through a center with respect to a direction parallel to the longitudinal direction W. The centerline CX1 is offset from the centerline CX2 toward the user operated member 34 as viewed in the center fastening axis direction Z of the fastener 70. The centerline CX1 of the connecting portion 44 extends through the center of the connecting portion 44 with respect to a direction orthogonal to the longitudinal direction W. The centerline CX2 of the coupling portion 40 extends through the center of the coupling portion 40 with respect to a direction orthogonal to the longitudinal direction W. The through hole 44A has a center D. As viewed in the center fastening axis direction Z, the center D of the through hole 44A is the gravity center of a cross section of the through hole 44A in a direction orthogonal to the through hole 44A. As viewed in the center fastening axis direction Z, the center D is offset toward the user operated member 34 from the centerline CX2 of the coupling portion 40 with respect to a direction parallel to the longitudinal direction W.

The user operated member 34 is movably coupled to the base member 32 so that the mechanical control cable S moves with respect to the base member 32 via the pulling member 36. In the present embodiment, the user operable member 34 is a lever. However, the user operable member 34 is not limited to lever, as illustrated, and can include, for example, a button, a switch, or a dial that is mechanically coupled to the pulling member 36. The user operated member 34 is arranged, for example, to operate the adjustable seatpost via the mechanical control cable S. The user operated member 34 is manually operated to move the mechanical control cable S via the pulling member 36 so that the adjustable seatpost is changed between a state in which the height of the seatpost is adjustable and a state in which the height of the seatpost is fixed.

The user operated member 34 includes a proximal end 56 located toward the base member 32 and a distal end 58 opposite to the proximal end 56. The proximal end 56 is formed in a disc-like shape and coupled to the support portion 54 of the base member 32. The proximal end 56 includes a projection 60 projecting radially outward with respect to the mounting axis C2, which will be described later.

As shown in FIG. 8, the user operated member 34 is movable with respect to the base member 32 between a rest position P1 and an operated position P2. The user operated member 34 rotates with respect to the base member 32 around the proximal end 56. It is preferred that the dimension of the user operated member 34 from the rotational center to the distal end 58 be greater than or equal to 26 mm and less than or equal to 70 mm. It is preferred that the stroke of the mechanical control cable S between the rest position P1 and the operated position P2 be greater than or equal to 9 mm and less than or equal to 18 mm. It is further preferred that the stroke be less than or equal to 10 mm. The user operated member 34 is provided with a biasing member 62. The biasing member 62 biases the user operated member 34 toward the rest position P1. The biasing member 62 is arranged between the base member 32 and the user operated member 34. In one example, the biasing member 62 includes a coil spring.

The bicycle operating device 30 further includes a bearing 64 rotatably supporting the user operated member 34 with respect to the base member 32. The bearing 64 is disposed between the proximal end 56 of the user operated member 34 and the support portion 54. In one example, the bearing 64 is a plain bearing. The bearing 64 can be a bearing including a rolling element.

The bicycle operating device 30 is configured not to mechanically fix a position of the mechanical control cable S with respect to the base member 32 in accordance with movement of the user operated member 34 between the rest position P1 and the operated position P2. More specifically, the bicycle operating device 30 does not have a mechanical positioning mechanism such as a ratchet mechanism. In a state where the user operated member 34 receives no force from the outside, the user operated member 34 is kept in the rest position P1 by biasing force of the biasing member 62 and contact of a first contact portion 42A of the body 42 with a second contact portion 56A of the proximal end 56. In a case where the user operated member 34 receives force applied from the outside (hereafter, referred to as external force), the user operated member 34 moves toward the operated position P2 in accordance with the external force. If the user operated member 34 is moved by the external force to the operated position P2, the projection 60 of the user operated member 34 comes into contact with the base member 32 and restricts a further relative movement. Thus, the user operated member 34 is kept in the operated position P2 by the external force. Thus, in a case where the user does not operate the user operated member 34, the user operated member 34 is kept in the rest position P1. In a case where the user operates the user operated member 34 so that the user operated member 34 is moved to the operated position P2 or a position between the rest position P1 and the operated position P2 and then releases the user operated member 34 from the hand, the user operated member 34 is returned to the rest position P1 by the biasing member 62. Thus, the bicycle operating device 30 does not include any structure that fixes the position of the mechanical control cable S with respect to the base member 32 in accordance with movement of the user operated member 34 between the rest position P1 and the operated position P2. The term "rest position" as used herein refers to a state in which a movable part (e.g., the user operated member 34) remains stationary without the need of a user or other external force intervening (e.g., holding the user operated member 34) to establish a state corresponding to the rest position. Thus, the term "rest position" can also be referred to as a non-operated position.

Here, the pulling member 36 can be considered to be a winding member or a cable winder that winds the mechanical control cable S around the mounting axis C2. However, the pulling member 36 can merely pull the mechanical control cable S as the pulling member 36 moves about the mounting axis C2. In the present embodiment, the pulling member 36 winds the mechanical control cable S around the mounting axis C2 in accordance with operation of the user operated member 34. The pulling member 36 includes a groove 36A in which the mechanical control cable S is wound. The pulling member 36 is formed integrally with the user operated member 34 but can be formed separately from the user operated member 34. The pulling member 36 is arranged on the circumference of the proximal end 56 of the user operated member 34. The mounting axis C2 is offset from the elongated hole 46 of the coupling portion 40 as viewed in the center fastening axis direction Z of the fastener 70. That is, the mounting axis C2 is disposed so as not to overlap the elongated hole 46 as viewed in the center fastening axis direction Z. The proximal end 56 of the user operated member 34 is disposed between the first end 46E of the elongated hole 46 and the mounting axis C2 as viewed in the center fastening axis direction Z of the fastener 70. The entire pulling member 36 is offset from the first wall 46A and the second wall 46B of the elongated hole 46 as viewed in the center fastening axis direction Z of the fastener 70. That is, the pulling member 36 is disposed so as not to overlap the first wall 46A and the second wall 46B as viewed in the center fastening axis direction Z.

Figure 10:
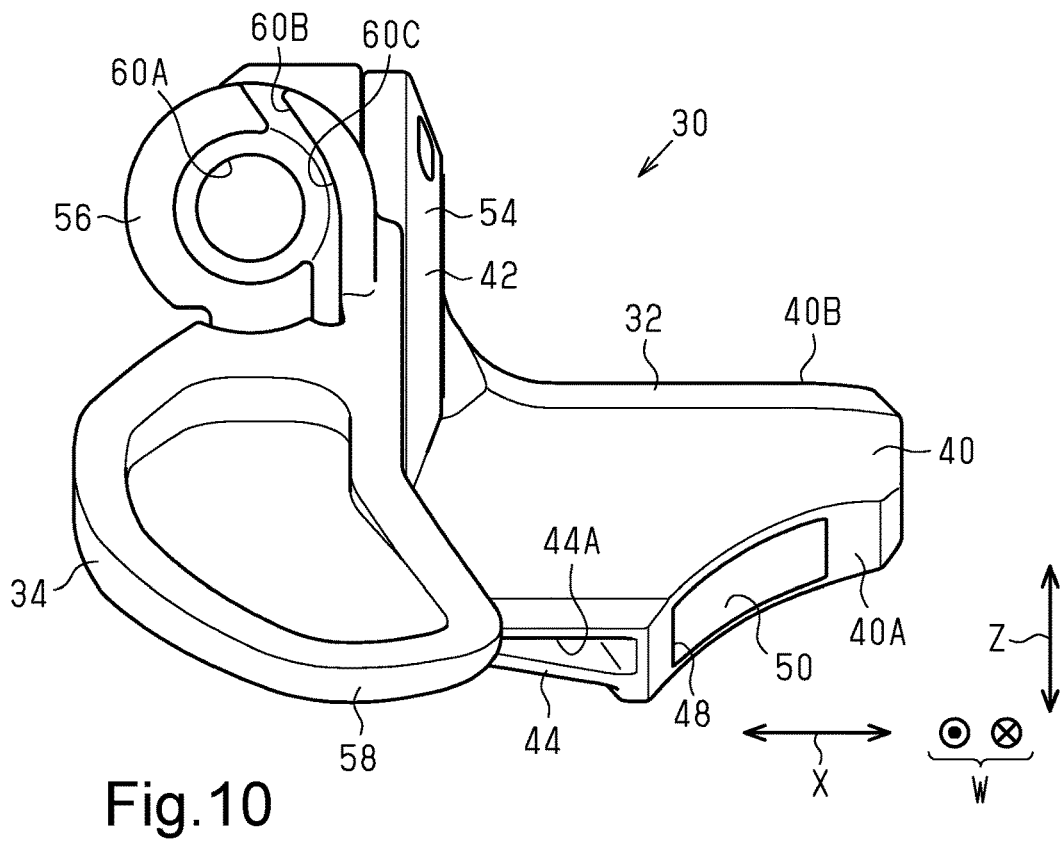
FIG. 10 is a left side elevational view of the bicycle operating device shown in FIG. 6.

As shown in FIG. 7, the bicycle operating device 30 further includes a cable fixing bolt 66 fixing the mechanical control cable S to the user operated member 34. As shown in FIG. 10, the user operated member 34 further includes an internal threaded portion 60A, to which the cable fixing bolt 66 is fastened, and a cable groove 60B formed in the vicinity of an opening of the internal threaded portion 60A so that the mechanical control cable S is disposed in the cable groove 60B. The cable groove 60B includes a bent portion 60C bent along the opening of the internal threaded portion 60A.

The cable tension adjuster 38 adjusts the tension of the mechanical control cable S. The cable tension adjuster 38 is arranged on the guide portion 52. With one end of the mechanical control cable S fixed by the cable fixing bolt 66, the tension of the mechanical control cable S can be adjusted by operation of the cable tension adjuster 38.

Figure 12:
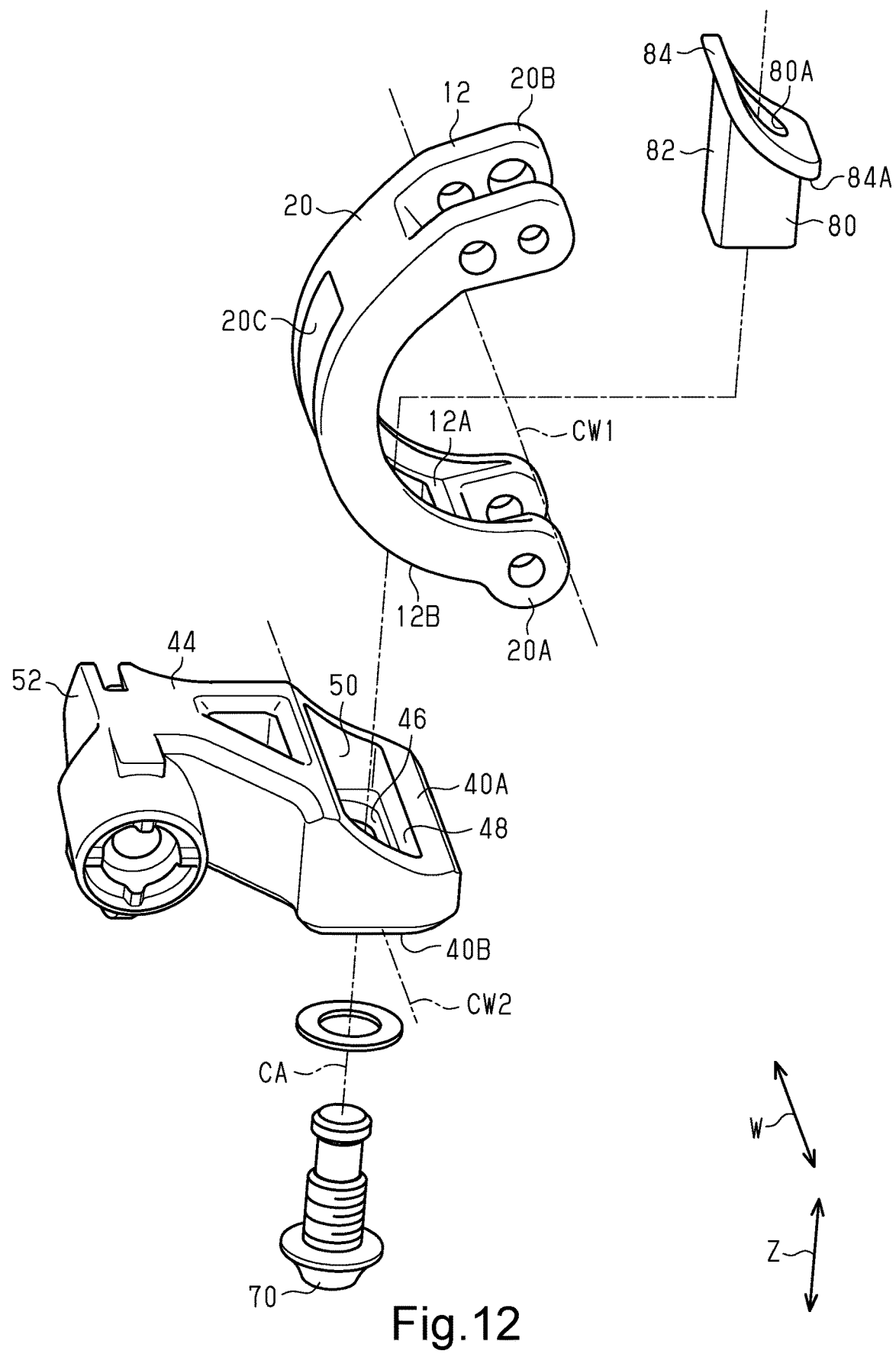
FIG. 12 is an exploded perspective view of a coupling structure of the clamp of the bicycle component and the bicycle operating device shown in FIG. 1.

The relationship between parts in a state where the coupling portion 40 is coupled to the clamp 12 will now be described with reference to FIGS. 11 to 13. As shown in FIGS. 11 and 12, the coupling hole 48 defines a second center axis CW2 extending through the center of the coupling hole 48 and parallel to the first center axis CW1 of the clamp 12. With the coupling portion 40 coupled to the clamp 12, the longitudinal direction W of the elongated hole 46 extends parallel to the first center axis CW1 of the clamp 12. The second surface 40B is a flat surface extending in a direction parallel to the mounting axis C2. The second surface 40B is opposite to the first surface 40A in a direction intersecting the mounting axis C2. At least one coupling hole 48 extends through the coupling portion 40 in a direction that intersect with the mounting axis C2 as viewed in a direction of a first center axis direction parallel to the first center axis CW1 of the clamp 12.

As shown in FIG. 12, the first surface 40A is configured to be coupled to the clamp 12 via the fastener 70 inserted into the at least one coupling hole 48. A nut 80 is inserted into the coupling hole 48. The nut 80 includes a rod 82 and a flange 84. The rod 82 has an outer surface, at least part of which is flat. The flange 84 includes a contact surface 84A contacting an inner surface 12A of the clamp 12. The arc of the contact surface 84A corresponds to the arc of the inner surface 12A of the clamp 12. In a state where the first hole 20C of the clamp 12 corresponds to the coupling hole 48, the nut 80 is inserted into the first hole 20C and the coupling hole 48. With the nut 80 inserted into the coupling hole 48, an end of the rod 82 located opposite to the flange 84 projects from the coupling hole 48. The fastener 70 is coupled to an internal threaded portion 80A of the nut 80 from the side of the second surface 40B. The coupling portion 40 of the bicycle operating device 30 is held together with the clamp 12 by the flange 84 of the nut 80 and a head of the fastener 70. This couples the coupling portion 40 to the clamp 12.

The first hole 20C is elongated in the circumferential direction. The coupling position of the bicycle operating device 30 in the circumferential direction of the clamp 12 can be adjusted by moving positions of the nut 80 and the fastener 70 in the first hole 20C. The position of the bicycle operating device 30 can be adjusted in a direction in which the handlebar H extends by moving positions of the nut 80 and the fastener 70 with respect to the coupling hole 48 and the elongated hole 46 of the bicycle operating device 30 in the longitudinal direction W.

Figure 13:
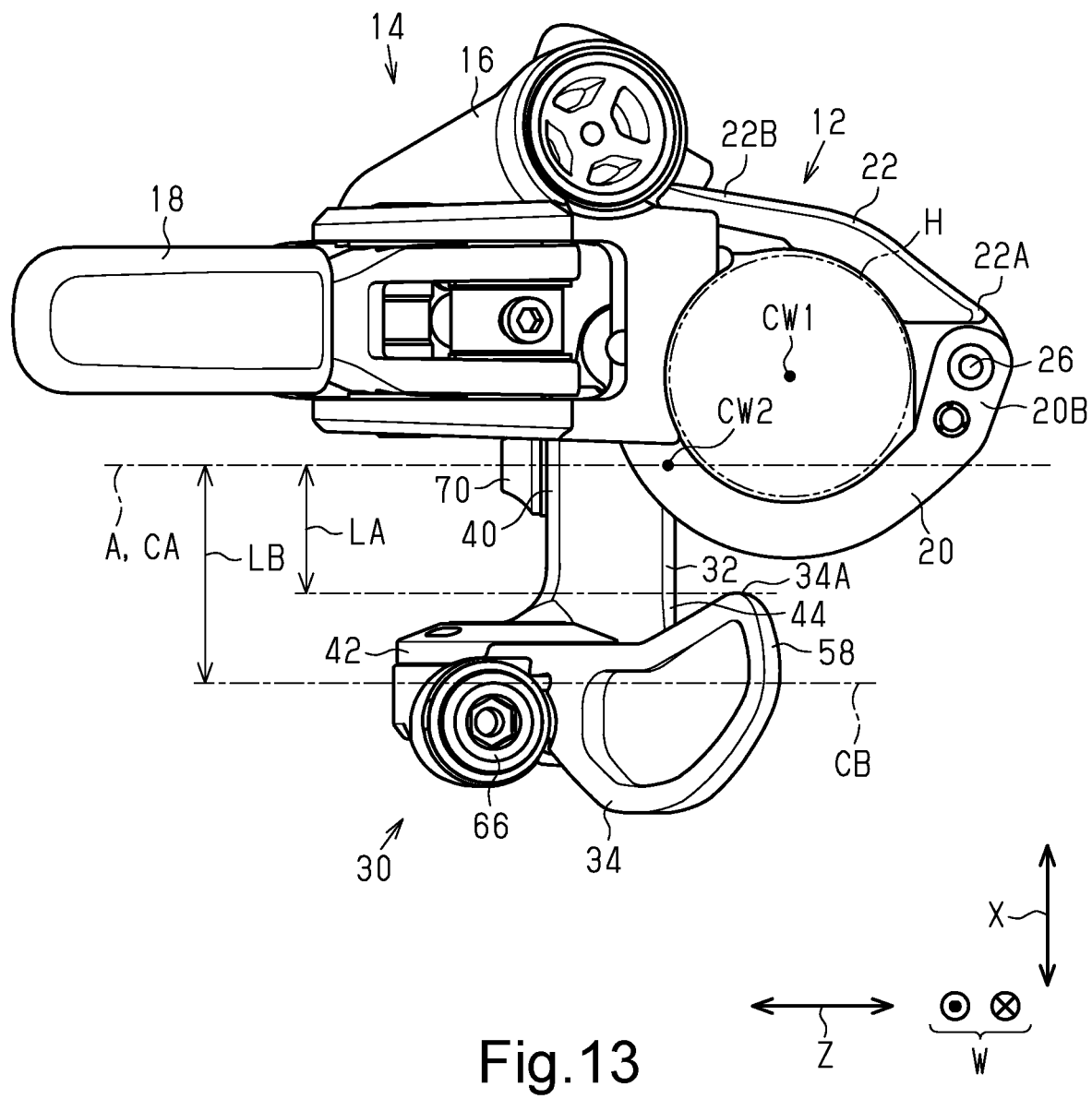
FIG. 13 is a left side elevational view of the bicycle operating device and the bicycle component shown in FIG. 1.

As shown in FIG. 13, the user operated member 34 includes a first part 34A disposed nearest to the handlebar H with the coupling portion 40 coupled to the clamp 12. The first part 34A is included in the distal end 58 of the user operated member 34 or the vicinity of the distal end 58. The fastener 70 and the elongated hole 46 define a reference plane A. The reference plane A includes the center axis CA of the fastener 70 and a straight line extending in the longitudinal direction W through a center of the elongated hole 46 with respect to a lateral direction. The reference plane A includes also includes the center axis CA of the fastener 70 and the second center axis CW2 of the coupling hole 48. Thus, the reference plane A extends in the center fastening axis direction Z of the fastener 70 and passing through a center of the elongated hole 46 along the longitudinal direction of the elongated hole 46. The first part 34A is separated from the reference plane A by a first distance LA that is greater than or equal to 6 mm. It is preferred that the first distance LA be greater than or equal to 10 mm. It is further preferred that the first distance LA be less than or equal to 13 mm. The groove 36A (refer to FIG. 9) of the pulling member 36, in which the mechanical control cable S is wound, has a center CB in a direction of the mounting axis C2. The reference plane A is separated from the center CB by a second distance LB that is greater than or equal to 14.2 mm. It is preferred that the second distance LB be less than or equal to 22 mm. In the bicycle operating device 30 shown in FIG. 13, the mounting axis C2 is orthogonal to the reference plane A. However, the mounting axis C2 can be inclined from the reference plane A by less than ninety degrees.

As shown in FIG. 3, the user operated member 34 includes a furthermost end 34B located furthest from the clamp 12 in the longitudinal direction W as viewed in the center axis fastening direction Z of the fastener 70. It is preferred that with the fastener 70 located in a portion of the elongated hole 46 furthest from the user operated member 34, a third distance LC between an end of the clamp 12 located toward the user operated member 34 and the furthermost end 34B in the longitudinal direction W be greater than or equal to 50 mm and less than or equal to 70 mm as viewed in the center fastening axis direction Z of the fastener 70. It is further preferred that the third distance LC be greater than or equal to 55 mm and less than or equal to 65 mm. In the present embodiment, the third distance LC is set to 60.6 mm.

The operation of the bicycle operating device 30 will now be described. With the bicycle operating device 30 that does not perform mechanical positioning between the rest position P1 and the operated position P2, the user operated member 34 moves in a smaller range than that of a bicycle operating device performing positioning. Thus, the user operated member 34 can be shortened. The appropriate position of the user operated member 34 differs depending on, for example, the size of a hand of the user and the shape of the bicycle B. With the bicycle operating device 30, the coupling position of the bicycle operating device 30 can be adjusted to the operated position of the user operated member 34 in the longitudinal direction W of the elongated hole 46. Additionally, a relative position of the operated position of the user operated member 34 and an operated position of the brake lever 18 can be adjusted to a desired position in the longitudinal direction W of the elongated hole 46.

Second Embodiment

A second embodiment of a bicycle assembly 90 will now be described with reference to FIGS. 14 to 17. The bicycle assembly 90 couples the clamp 12 to a bicycle operating device including a coupling portion that is configured to be coupled to the clamp 12 but is not shaped to correspond to the shape of the outer surface 12B of the clamp 12. In FIGS. 14 to 17, a bicycle operating device 100 functioning as a bicycle shift operating device that operates a bicycle shifting device is used as one example of a bicycle operating device. However, the bicycle operating device coupled to the clamp 12 by the bicycle assembly 90 is not limited to a bicycle shift operating device. The bicycle operating device coupled to the clamp 12 by the bicycle assembly 90 can be, for example, an operating device of a suspension controller or an operating device of an adjustable seatpost.

The bicycle operating device 100 includes a base member 102 configured to be coupled to the clamp 12 and a user operated member 104. The base member 102 is configured to be coupled to the clamp 12. The base member 102 includes a coupling portion 106 configured to be coupled to the clamp 12.

Figure 15:
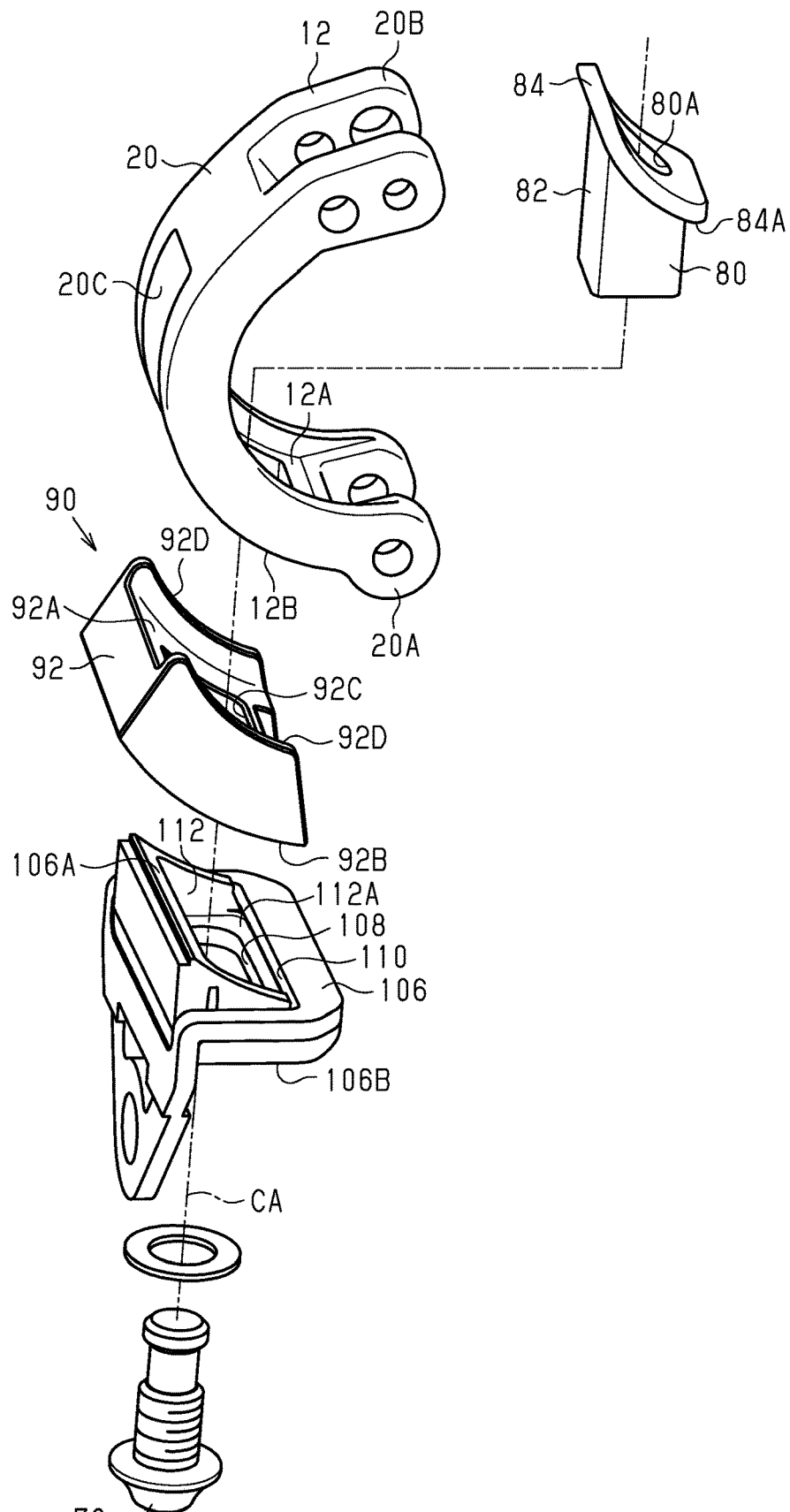
FIG. 15 is an exploded perspective view of a coupling structure of a clamp of a bicycle component and a bicycle operating device using the bicycle assembly shown in FIG. 14.

As shown in FIG. 15, the coupling portion 106 includes an elongated hole 108. The coupling portion 106 has a longitudinal direction. The elongated hole 108 has a longitudinal direction extending in the longitudinal direction of the coupling portion 106. In the present embodiment, the elongated hole 108 is formed so that the longitudinal direction of the elongated hole 108 corresponding to the longitudinal direction of the coupling portion 106. The coupling portion 106 includes a first surface 106A located toward the clamp 12, a second surface 106B opposite to the first surface 106A, and at least one coupling hole 110 extending through the first surface 106A and the second surface 106B. The coupling hole 110 can adjust the coupling position of the coupling portion 106 in the direction of the first center axis CW1 of the clamp 12. The first surface 106A includes a recess 112. The coupling hole 110 extends through a bottom surface 112A of the recess 112. The elongated hole 108 is open in the bottom surface 112A of the recess 112. That is, the elongated hole 108 extends through the bottom surface 112A. The coupling hole 110 includes the recess 112 and the elongated hole 108. The bottom surface 112A of the recess 112 is a flat surface parallel to the second surface 106B. The first surface 106A is formed in an arc-shape.

The bicycle assembly 90 includes a bicycle adapter 92 and the nut 80. The bicycle adapter 92 is configured to couple the bicycle operating device 100 to the clamp 12 coupled to the handlebar H. The bicycle assembly 90 can further include the fastener 70. The fastener 70 is fastened to the nut 80 so that the bicycle operating device 100 is coupled to the clamp 12 via the adapter 92. The bicycle adapter 92 includes a first attachment surface 92A configured to be attached to the outer surface 12B of the clamp 12 and a second attachment surface 92B configured to be attached to the bicycle operating device 100.

Figure 14:
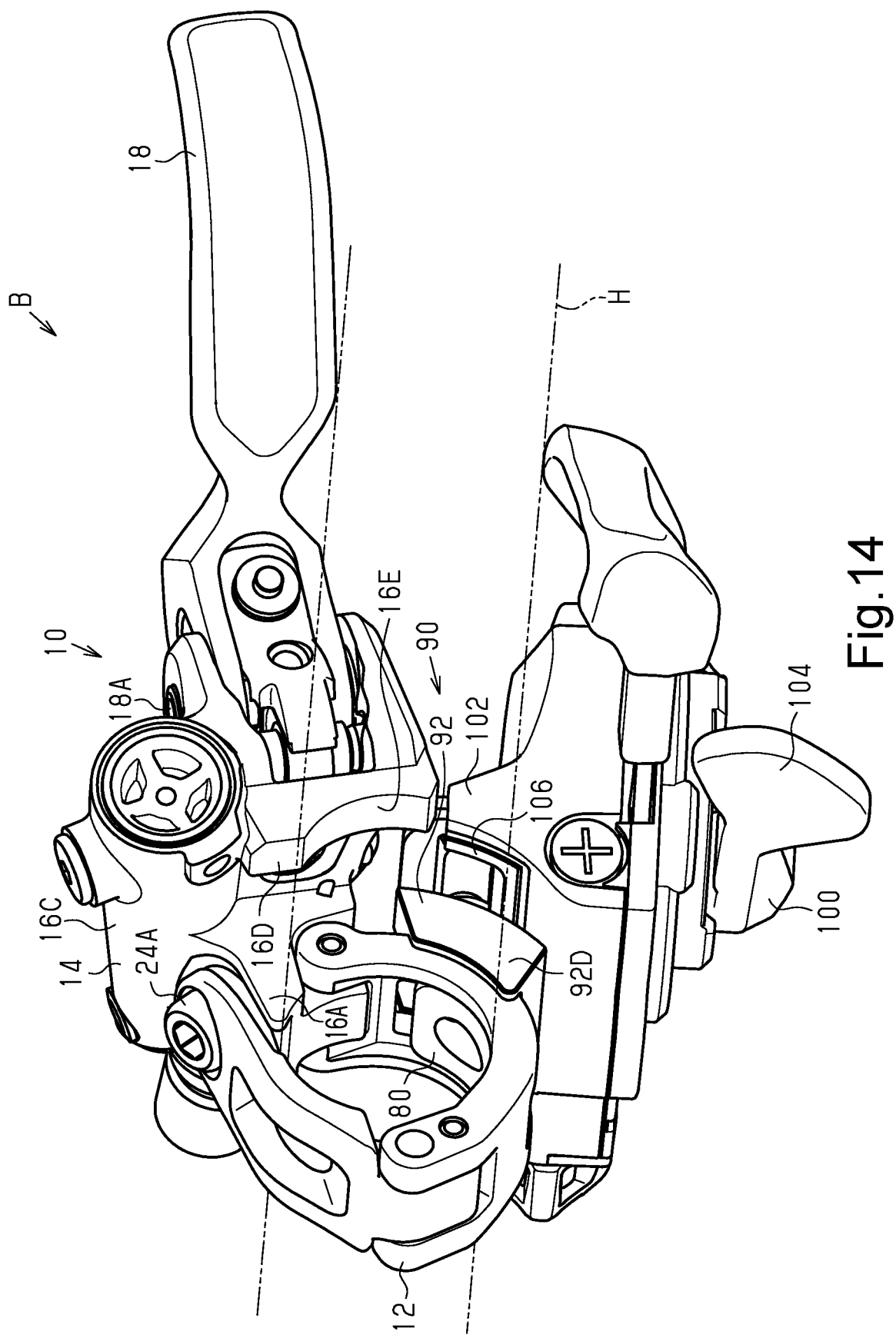
FIG. 14 is a perspective view of a bicycle operating device coupled to a clamp in accordance with a second embodiment of a bicycle assembly.
Figure 16:
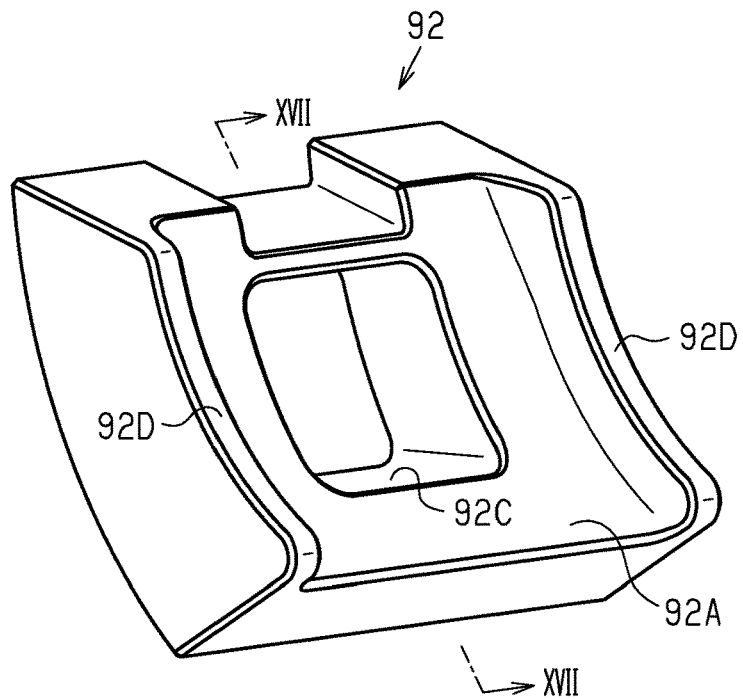
FIG. 16 is an enlarged perspective view of a bicycle adapter of the coupling structure shown in FIG. 15.
Figure 17:
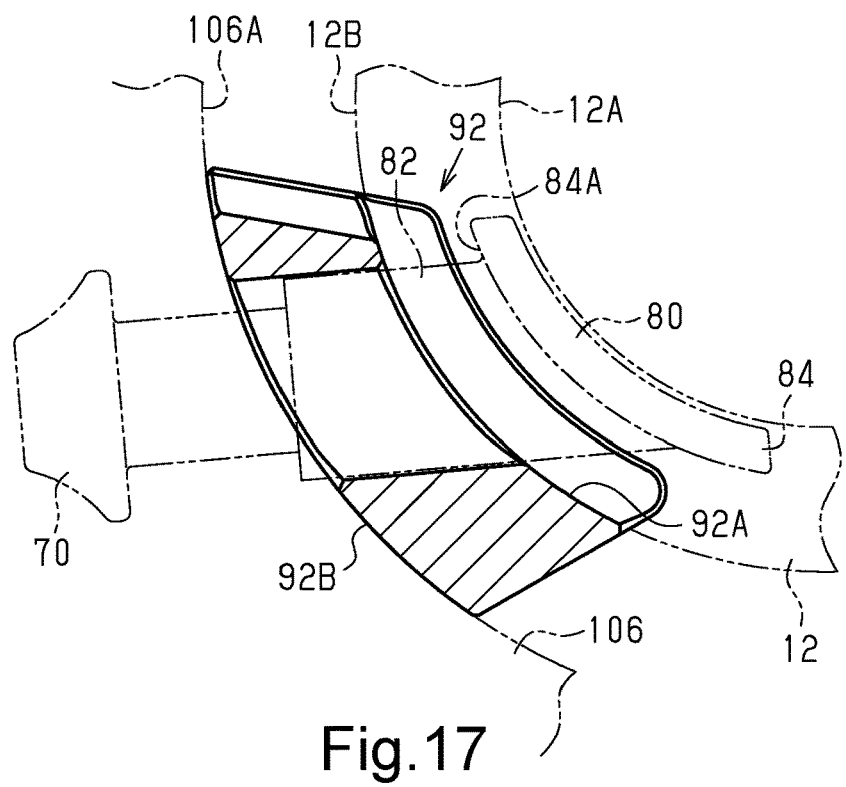
FIG. 17 is a cross-sectional view of the bicycle adapter taken along section line XVII-XVII in FIG. 16.

The first attachment surface 92A shown in FIGS. 16 and 17 has a first curved section. The second attachment surface 92B has a second curved section that is different from the first curved section. In the present embodiment, the second curved section is less curved than the first curved section. However, the second curved section can be configured to have an arc that is larger than an arc of the first curved section. The arc of the first surface 106A of the coupling portion 106 corresponds to the second curved section. The bicycle adapter 92 further includes a nut insertion hole 92C open in the first attachment surface 92A and the second attachment surface 92B. The nut 80 is inserted into the nut insertion hole 92C to be coupled to the clamp 12. The nut insertion hole 92C includes a wall surface, having at least a part of which is flat. The shape of the wall surface of the nut insertion hole 92C corresponds to the shape of the outer surface of the rod 82 of the nut 80. The first attachment surface 92A includes projections 92D projecting in a direction opposite to the side of the second attachment surface 92B. The projections 92D are arranged at opposite sides of the first attachment surface 92A in the longitudinal direction W. As shown in FIG. 14, with the bicycle adapter 92 coupled to the clamp 12, the projections 92D are in contact with opposite surfaces of the clamp 12 with respect to the direction of the first center axis CW1. Thus, the bicycle adapter 92 is positioned with respect to the clamp 12 in the direction of the first center axis CW1.

As shown in FIG. 15, the nut 80 includes the rod 82 and the flange 84. The rod 82 has an outer surface, at least part of which is flat. The flange 84 includes the contact surface 84A contacting the inner surface 12A of the clamp 12. The contact surface 84A has a third curved section is more curved than the first curved section. As shown in FIG. 17, with the nut 80 inserted into the nut insertion hole 92C, the rod 82 projects from the insertion hole 92C. The fastener 70 is coupled to the internal threaded portion 80A of the nut 80 from the side of the second surface 40B. The coupling portion 40 of the bicycle operating device 100 is held together with the clamp 12 and the bicycle adapter 92 by the flange 84 of the nut 80 and the head of the fastener 70. This couples the coupling portion 40 to the clamp 12.

Modifications

The description related to the above embodiments exemplifies, without any intention to limit, applicable forms of a bicycle operating device, a bicycle adapter, and a bicycle assembly according to the present invention. The bicycle operating device, the bicycle adapter, and the bicycle assembly according to the present invention are applicable to, for example, modifications of the above embodiments that are described below and combinations of at least two of the modifications that do not contradict each other. In the modifications described below, the same reference characters are given to those elements that are the same as the corresponding elements of the embodiments. Such elements will not be described in detail.

The connecting portion 44 can include a recess instead of or in addition to the through hole 44A. The connecting portion 44 can be rectangular as viewed in the center fastening axis direction Z. In this case, it is preferred that the through hole 44A be shaped as a rectangle similar to the shape of the connecting portion 44.

The coupling holes 48 and 110 are not limited to elongated holes and can be changed to holes that do not have a long direction. In this case, a plurality of coupling holes 48 and 110 can be arranged in the long direction W. In this case, the coupling positions of the bicycle operating devices 30 and 100 can be changed by selecting the coupling hole 48 and the coupling hole 110 into which the fastener 70 is inserted from the plurality of coupling holes 48 and the plurality of coupling holes 110, respectively.

The bicycle operating devices 30 and 100 are not limited to operating devices operating a bicycle component with the mechanical control cable S and can be changed to electrical operating devices (electric switches). An electrical operating device can be connected by an electric cable to a bicycle component that is to be operated. Further, instead of a connection with an electric cable, a user operated member and a bicycle component can transmit signals between each other through wireless communication.

What is claimed is:

1. A bicycle attachment structure for coupling a bicycle operating device to a handlebar clamp coupled to a handlebar, the bicycle attachment structure comprising:
   the handlebar clamp including a first hole;
   a base member of the bicycle operating device, the base member including a second hole;
   a nut; and
   a bicycle adapter configured to be disposed between the handlebar clamp and the base member,
   the bicycle adapter including a first attachment surface, a second attachment surface, and a nut insertion hole for receiving the nut, the nut insertion hole extending through the first attachment surface and the second attachment surface, the handlebar clamp, the base member, and the bicycle adapter being configured to be fitted together such that the first hole, the second hole, and the nut insertion hole are aligned with one another with the first attachment surface facing an outer surface of the handlebar clamp and the second attachment surface facing the base member, each of the first hole, the second hole, and the nut insertion hole being configured to allow a fastener to pass through.

2. The bicycle attachment structure according to claim 1, wherein
the nut insertion hole includes a wall surface having at least a part of which is flat.

3. The bicycle attachment structure according to claim 1, wherein
the first attachment surface includes a projection projecting in a direction opposite to a side of the second attachment surface.

4. The bicycle attachment structure according to claim 1, wherein
the first attachment surface includes a pair of projections projecting in a direction opposite to a side of the second attachment surface.

5. The bicycle attachment structure according to claim 4, wherein
the projections are arranged at opposite lateral sides of the first attachment surface with respect to each other so that the projections contact opposite lateral surfaces of the handlebar clamp.

6. The bicycle attachment structure according to claim 5, wherein
the first attachment surface is recessed with respect to both projections of the pair of projections along an entire length of the pair of projections such that the first attachment surface contacts the outer surface of the handlebar clamp with projections extending inward along the lateral surfaces of the handlebar clamp.

7. The bicycle attachment structure according to claim 1, wherein:
the nut is disposed in the first hole, the second hole, and the nut insertion hole.

8. The bicycle attachment structure according to claim 7, wherein
the nut contacts an inner surface of the handlebar clamp.

9. The bicycle attachment structure according to claim 7, wherein
the nut includes a rod and a flange.

10. The bicycle attachment structure according to claim 9, wherein
the rod includes an outer surface having at least a part of which is flat.

11. The bicycle attachment structure according to claim 9, wherein
the flange includes a contact surface contacting an inner surface of the handlebar clamp, and the contact surface has a third curved section that is more curved than the first curved section.

12. The bicycle attachment structure according to claim 9, wherein
the rod projects from the nut insertion hole with the nut disposed in the nut insertion hole.

13. The bicycle attachment structure according to claim 7, wherein
the nut includes an opening.

14. The bicycle attachment structure according to claim 13, wherein
the opening of the nut includes a threaded internal portion.

15. The bicycle attachment structure according to claim 13, wherein
the opening of the nut receives the fastener with the fastener extending through the second hole and the nut insertion hole.

16. The bicycle attachment structure according to claim 1, further comprising:
the fastener,
the nut and the fastener being configured to be arranged in the first hole, the second hole, and the nut insertion hole.

17. The bicycle attachment structure according to claim 16, wherein
the nut includes an opening having an internally threaded portion, and
the fastener includes an externally threaded portion configured to engage with the internally threaded portion.

18. A bicycle attachment structure for coupling a bicycle operating device to a handlebar clamp coupled to a handlebar, the bicycle attachment structure comprising:
the handlebar clamp including a first hole;
a base member of the bicycle operating device, the base member including a second hole; and
a bicycle adapter configured to be disposed between the handlebar clamp and the base member,
the bicycle adapter including a first attachment surface, a second attachment surface, and a nut insertion hole extending through the first attachment surface and the second attachment surface,
the handlebar clamp, the base member, and the bicycle adapter being configured to be fitted together such that the first hole, the second hole, and the nut insertion hole are aligned with one another with the first attachment surface facing an outer surface of the handlebar clamp and the second attachment surface facing the base member,
each of the first hole, the second hole, and the nut insertion hole being configured to allow a fastener to pass through,
the first attachment surface having a first curved section, and
the second attachment surface having a second curved section that is different from the first curved section,
the second curved section being less curved than the first curved section.

* * * * *